M. DOYLE.
Apparatus for Cleaning and Polishing Coffee, &c.

No. 206,866. Patented Aug. 13, 1878.

UNITED STATES PATENT OFFICE.

MICHEAL DOYLE, OF BROOKLYN, NEW YORK.

IMPROVEMENT IN APPARATUS FOR CLEANING AND POLISHING COFFEE, &c.

Specification forming part of Letters Patent No. 206,866, dated August 13, 1878; application filed April 5, 1878.

*To all whom it may concern:*

Be it known that I, MICHEAL DOYLE, of the city of Brooklyn, in the county of Kings and State of New York, have invented certain new and useful Improvements in Apparatus for Cleaning, Polishing, and Sifting Coffee or other Grain; and I do hereby declare that the following is a full, clear, and exact description thereof, which will enable others skilled in the art to which it appertains to make and use the same, reference being had to the accompanying drawings, and to the letters of reference marked thereon, which form a part of this specification.

This invention relates to apparatus used in the preparation of coffee or other grain for domestic use.

Figure 1:
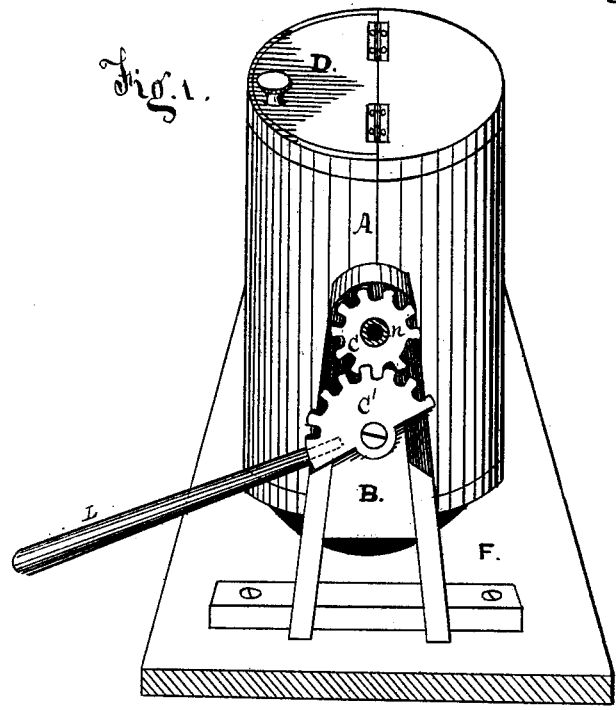
Figure 2:
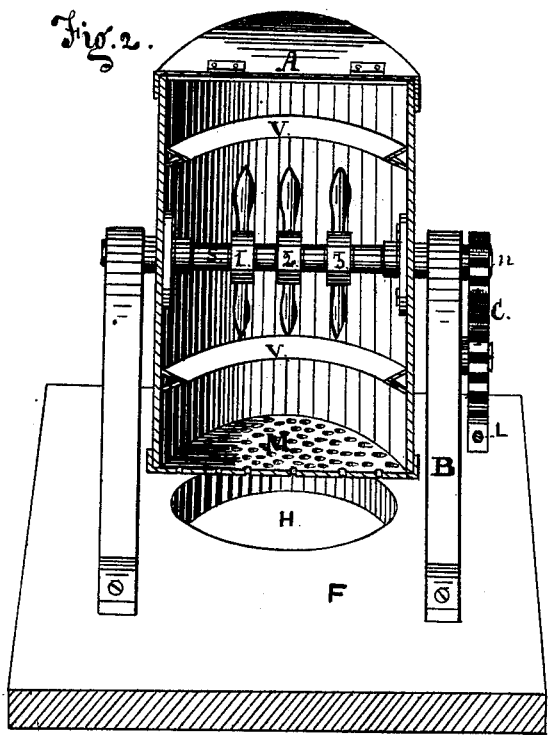

Referring to the drawings, Figure 1 is a perspective side view of my coffee-cleaner, polisher, and sifter. Fig. 2 is a vertical section of the same.

A is an oscillating cylinder, provided with and hung upon a transverse axis, S, passing through the center of the body thereof, said axis being provided with a journal at each end thereof operating in bearings in the top of the supporting frame-work B, and provided with arms 1 2 3, firmly secured to the oscillating shaft S, to agitate the coffee as it falls from the beveled ribs V upon the inside of the cylinder A, when the same is in motion, by means of the cogged gearing C C', operated by the lever L, or otherwise.

The grain falls from one end of the cylindrical chamber A to the other, and becomes perfectly polished and cleaned by the continuous falling through the rocking arms 1 2 3 upon the shaft S at any suitable point, and these arms may be of any desired shape for the different kinds of grain; and when it becomes necessary I employ a perforated head or sieve, M, for screening purposes, as shown at the lower end or bottom of the cylinder, (see Fig. 2,) while the hinged head D, Fig. 1, is solid, except the hinged opening employed to introduce and discharge the coffee or other grain from the oscillating chamber A at different angles, or directly through the opening H in the flooring F. Steam may also be admitted into the chamber A, through the journal $n$, if necessary.

Having thus described the individual parts of my invention, I will here state that its novelty consists of an oscillating chamber, A, of any suitable form, mounted upon a transverse shaft, S, having bearings at each end thereof, and operating backward and forward by means of the rocking toothed gearing C C', worked by any suitable power, such as the lever L, to produce the oscillating motion required for tumbling the coffee, &c., over the beveled ribs V and arms 1 2 3.

What I claim as novel and useful, and wish to protect by Letters Patent of the United States, is—

An apparatus for cleaning, polishing, and sifting coffee or other grain, consisting of an oscillating cylinder, A, in combination with the arms 1 2 3, bevel-flange V, screen M, and gearing C C', all constructed, arranged, and operating in the manner and for the purpose set forth.

In testimony that I claim the foregoing as my own invention I affix my signature in presence of two witnesses.

MICHEAL DOYLE.

Witnesses:
 JAMES P. MCLEAN,
 ROBERT A. MORRISON.